(12) United States Patent
Hoffmann et al.

(10) Patent No.: US 7,544,013 B2
(45) Date of Patent: Jun. 9, 2009

(54) INSTALLATION FOR MANUFACTURING WOUND RIGID TUBULAR PIPES

(75) Inventors: Philippe Hoffmann, Paris (FR); Pierre-Armand Thomas, Puteaux (FR)

(73) Assignee: Technip France (FR)

( * ) Notice: Subject to any disclaimer, the term of this patent is extended or adjusted under 35 U.S.C. 154(b) by 525 days.

(21) Appl. No.: 10/540,798

(22) PCT Filed: Dec. 8, 2003

(86) PCT No.: PCT/FR03/03627

§ 371 (c)(1), (2), (4) Date: Jul. 28, 2005

(87) PCT Pub. No.: WO2004/068015

PCT Pub. Date: Dec. 8, 2004

(65) Prior Publication Data

US 2005/0281620 A1 Dec. 22, 2005

(30) Foreign Application Priority Data

Dec. 30, 2002 (FR) .................................. 02 16867

(51) Int. Cl.
*F16L 1/20* (2006.01)
(52) U.S. Cl. .................................. 405/170; 400/168.1
(58) Field of Classification Search .................. 405/170, 405/169, 168.1
See application file for complete search history.

(56) References Cited

U.S. PATENT DOCUMENTS 4,117,692 A * 10/1978 Oberg ........................ 405/166
4,260,288 A 4/1981 Ellers et al. ............... 405/168.3
4,594,871 A * 6/1986 de Boer .................... 405/168.3
5,346,333 A * 9/1994 Maloberti et al. ........ 405/168.3
5,464,307 A 11/1995 Wilkins ....................... 405/166
6,540,440 B1 * 4/2003 Beaujean .................. 405/168.1

FOREIGN PATENT DOCUMENTS

| EP | 0 909 254   | 4/1999  |
| EP | 0 868 621 B | 3/2002  |
| GB | 2 025 566   | 1/1980  |
| GB | 2 287 518   | 9/1995  |
| GB | 2 296 956   | 7/1996  |
| WO | WO 0011388  | 3/2000  |

OTHER PUBLICATIONS

International Search Report PCT/FR03/03627 dated May 6, 2004.

\* cited by examiner

*Primary Examiner*—John Kreck
(74) *Attorney, Agent, or Firm*—Ostrolenk, Faber, Gerb & Soffen, LLP

(57) ABSTRACT

An installation for manufacturing a wound rigid tubular pipe intended to be installed by a laying ship. An assembly unit for assembling a plurality of rigid tubes end to end to obtain lengths and for assembling the lengths to form the rigid tubular pipe which is intended to be wound onto a storage reel situated on the laying ship. An intermediate winding and deforming apparatus arranged on a first float distinct from the laying ship in order to plastically deform the rigid tubular pipe and wind it onto the intermediate winding apparatus after the rigid tubular pipe has been formed. A connector connecting together the first float and the assembly unit.

11 Claims, 3 Drawing Sheets

INSTALLATION FOR MANUFACTURING WOUND RIGID TUBULAR PIPES

CROSS REFERENCE TO RELATED APPLICATION

The present application is a 35 U.S.C. §§ 371 national phase conversion of PCT/FR2003/003627, Filed 8 Dec. 2003, which claims priority of French Application No. 02 16867, filed 30 Dec. 2002. The PCT International Application was published in the French language.

BACKGROUND OF THE INVENTION

The present invention relates to an installation for manufacturing a wound rigid tubular pipe.

Rigid tubular pipes thus wound are intended to be unwound and straightened to be installed subsea by a laying ship with a view in particular to carrying hydrocarbons. This pipe-laying technique is known as the reeled pipe system.

In the field of oil prospecting, a distinction is made between flexible pipes and rigid pipes. Reference may be made to specifications API 17B and 17J by the American Petroleum Institute for the definition of flexible pipes and to specification API 17A for the definition of rigid pipes; it is recalled that flexible pipes have a minimum bend radius to which they can be bent without damage (often known as MBR for minimum bending radius) that is relatively small (for example a few metres) by comparison with rigid pipes whose minimum radius of curvature without plastic deformation is relatively large (for example several tens of metres).

Furthermore, for a flexible pipe, the MBR corresponds to a limit before irreversible damage occurs whereas in the case of a rigid pipe, the minimum bending radius corresponds to the onset of plastic deformation which can be reversed by straightening.

Laying systems for rigid pipes are described in specification API 17A and a distinction is drawn therein between two types of laying depending on whether the lengths of pipe are welded at sea (stove piping) or welded on land (reeled pipe). The first type of laying itself has three main subdivisions, "S-lay", "J-lay" and "G-lay".

In the "S-lay" technique, the lengths of pipe are assembled horizontally on the deck of the ship to form the pipe and the pipe is made to follow, in a depth of water, an S-shaped path with a point of inflection and a very large radius of curvature so as to prevent it from experiencing plastic deformation. The pipe leaves the ship at an oblique angle with respect to the surface of the water, using an inclined stinger. This technique is suitable only for shallow and moderate laying depths, because otherwise the weight of the string of pipe already laid runs the risk of bending and plastically deforming the pipe where it leaves the stinger. This is why other techniques have had to be developed for greater depths of water.

In the "J-lay" technique, the lengths of pipe are assembled on an inclinable tower of the laying ship that is positioned close to vertical, the lengths thus being welded together in the direction in which the pipe is laid, thus avoiding any plastic deformation at this stage, the assembled pipe then being submerged, still without plastic deformation. The inclination of the tower is, in particular, dependent on the depth of water and it makes it possible to avoid the point of inflection that there is in the "S-lay" technique. Reference may be made to document U.S. Pat. No. 5,464,307 which illustrates this laying technique.

In the "G-lay" technique, illustrated in particular in document GB 2 287 518 A, lengths of pipe are assembled horizontally on the deck of a ship as in the case of the "S-lay" technique; the pipe formed is sent towards the bow of the ship then returned towards the stern by a large wheel giving rise to plastic deformation in the pipe, after which this pipe passes through straighteners and a succession of multi-track tensioners, then is launched into the water at a certain angle of inclination that can be chosen according to the depth of water to avoid plastically deforming the pipe at the submerged string. In an alternative form described in document GB 2 296 956 A, the pipe, already assembled in lengths on the deck, is sent to an arched gutter placed at the top of an inclinable ramp provided with tensioners or gripping jaws; the two inflections that the pipe undergoes lead to plastic deformation of the pipe and make the use of straigteners necessary. The laying speed using the "G-lay" technique is relatively slow.

The second type of technique for laying rigid pipes, in lengths welded on land, known as the reeled pipe system, is illustrated for example in document GB 2 025 566 A in which the pipe, welded in long lengths (in excess of 1 km for example) at the dockside, is then wound with plastic deformation around a vertical reel (which may reach as much as 15 to 20 metres in diameter) situated on the laying ship moored dockside.

The pipe is assembled on the dockside in an assembly base known as a spool base and the length of the lengths is dependent on the space available. The winding of the pipe consists in winding a first length then stopping winding to connect it to a second length by welding. This welding needs to be checked then covered with a coating to preserve it from corrosion in particular. These operations are lengthy and delay the loading of the laying boat still further.

After the laying ship has reached the laying site, the pipe is unwound again from the reel with plastic deformation and passed through a straightener-distributor guide before being taken up by the tracked conveyors of an inclinable laying ramp provided in a region for submerging the pipe at the stern of the ship and the inclination of which is chosen to suit the laying depth.

In order to reduce as far as possible the length of time for which the laying ships are occupied with operations other than actual laying, and in particular with operations of loading the rigid pipes, new rigid pipes are produced while the laying boat is submerging a pipe.

One problem that arises and that the invention described in document EP 0 909 254 B1 aims to solve is therefore that of manufacturing the entire pipe, or at the very least very long lengths of pipe, before the arrival of the laying boat.

To do this, the rigid pipe is wound on itself with a radius of curvature greater than 150 metres in order to avoid plastically deforming it, then it is unwound and wound onto a storage reel mounted on the laying boat moored dockside. In that way, the winding of the pipe onto its storage wheel can be performed continuously and the time spent connecting the lengths is eliminated.

Given the size of the laying boat storage reel, measuring of the order of about ten metres, the rigid pipe is plastically deformed during winding.

However, the unit for assembling and storing the rigid pipes (otherwise known as a spool base) is too large and in order to remedy this, the idea has been had for the rigid pipe to be wound up on the water, deforming it within its elastic limits so as not to plastically deform it. Thereafter, it is conveyed thus wound to the laying site.

These methods have been described in documents WO 00/11388 and U.S. Pat. No. 4,260,288.

The first document describes the production of a rigid pipe by assembling rigid tubes then forming a spiral on the surface of the water using floating guide means. The rigid pipe thus wound in a mean plane roughly parallel to the surface of the water forming a very large assembly about 250 metres in diameter, is then transported by two tugs to the laying boat. The latter is designed to guide the pipe to deposit it on the seabed, while the tugs pull it along and pay it out upstream.

The second document also discloses the formation of a rigid pipe which is wound on the water in a plane parallel to the surface of the water, at the dockside on floating winding means. These floating winding means are then towed out to the laying site then stood up vertically to pay the pipe out.

Given the size of the assemblies formed by these wound rigid pipes which are rendered necessary in order not to plastically deform the said pipes, otherwise they would have to be straightened on the laying vessel, their transportation is rather uneconomical. Indeed, it takes a great deal of power to drag the pipes thus wound through the water.

Still with a view to reducing the time for which the laying boat is unavailable for laying and to transporting the pipes produced on land to the laying site, but reducing significantly the size of the rigid pipes as wound according to the preceding document, document U.S. Pat. No. 4,117,692 has conceived of the idea of plastically deforming the pipe and of winding it onto a storage reel arranged horizontally on the surface of the water.

However, transporting the pipe by dragging through the water the storage reel which nonetheless exhibits a certain resistance to the water as it moves along, is also rather uneconomical.

In addition, in these methods where the rigid pipe is moved through the water, any debris floating on the surface is likely to damage it.

To overcome this, document EP 0 868 621 has conceived of the idea of winding the rigid pipe onto a storage reel mounted on a boat by plastically deforming it; the pipe then being transported to the laying boat then rewound onto a storage reel belonging to the laying boat so that it can then be reeled out to the bottom of the water.

However, it is found that transferring from one reel to the other on the high seas is rather awkward given the relative motion of the boats due to the swell. In addition, although this solution makes it possible to avoid unavailability of the laying boat, it does not, however, solve the need to have a land-based manufacturing base of the spool base type, with the aforementioned problems of space. The problems of unavailability time are then transferred to the supply boat which transports the rigid pipe out from the manufacturing base to the laying boat.

SUMMARY OF THE INVENTION

An object of the present invention is therefore to provide an installation for manufacturing wound rigid tubular pipe that can be straightened and laid by a laying boat, the installation making it possible not only to reduce the amount of space needed to produce the rigid pipes but also to reduce as far as possible the time for which the laying boat is inactive, that is to say for which it is not laying pipe.

To this end, the present invention proposes an installation for manufacturing a wound rigid tubular pipe, the said rigid tubular pipe being intended to be installed subsea by a laying ship to carry hydrocarbons in particular, the said installation comprising an assembly unit for assembling a plurality of rigid tubes end to end to obtain lengths and for assembling the said lengths in such a way as to form the said rigid tubular pipe which is intended to be wound onto a storage reel situated on the said laying ship having undergone plastic deformation. The said installation comprises:

deforming means and intermediate winding means arranged on first floating means distinct from the said laying ship to plastically deform the said rigid tubular pipe and wind it onto the said intermediate winding means after the said rigid tubular pipe has been formed; and connecting means designed to connect together the said first floating means and the said assembly unit.

Thus, one characteristic of the invention lies in the method of storage of the rigid tubular pipe near the assembly unit on intermediate winding means situated on first floating means, the rigid pipe being wound plastically deformed by the deforming means so that it occupies a relatively small amount of space. Furthermore, by virtue of the connecting means which allow the first floating means to be held in position with respect to the assembly unit, the rigid pipe can be perfectly guided from the assembly unit to be wound precisely onto the intermediate winding means without leaving gaps so as to store a maximum length of rigid pipe. Thereafter, the laying ship is designed to be positioned facing an end of the first floating means, which is the opposite end to the other end which is situated near the assembly unit, so as to wind the rigid pipe onto a storage reel belonging to the laying ship. To do this, the loading of the intermediate winding means via the assembly unit is halted and the rigid pipe is unwound and deformed elastically then guided towards the laying ship to be rewound onto the storage and laying reel of the laying ship.

This transfer is advantageously performed without the need to straighten the pipe prior to rewinding it onto the laying boat storage reel.

Advantageously, the intermediate winding and deforming means comprise an intermediate storage reel the drum diameter of which is greater than the drum diameter of the said storage reel of the laying boat; the drum being of cylindrical shape and having cheeks at each of its ends to confine the turns of the wound rigid pipe.

As a preference, the drum diameter of the said intermediate storage reel is greater than the maximum diameter of a last portion of rigid pipe likely to be wound onto the said storage reel of the laying boat.

Thus, as the pipe is being transferred from the intermediate storage reel to the storage and laying reel, the pipe does not undergo any straightening, that is to say any plastic deformation in the opposite direction to the plastic deformation conferred upon the pipe when it was wound onto the intermediate storage reel.

Incidentally, it may be noted that the storage capacity of the intermediate winding means (measured for example by weight) is advantageously at least equal to the storage capacity of the laying boat, in the knowledge that some boats are able to have several laying reels.

According to one particularly advantageous implementation of the invention, the said assembly entity is mounted on second floating means. In that way, not only can the first floating means on which the intermediate winding means rest be connected, but the assembly unit is also designed to be moored dockside without there being any need to provide special equipment on this dock.

Thus, the installation is completely mobile on the water and can be towed into and moored in the port closest to the pipe-laying site.

According to a particular embodiment, the said second floating means have a length of between 40 and 120 metres, for example a length of 50 metres so that the rigid tubes can be assembled first of all in fours to form lengths of pipe then so that the lengths can be assembled to form the rigid pipe. Furthermore, such a size allows the means for treating and coating the pipe which are intended to protect it to be laid out without inconvenience.

As a preference, the said connecting means are mounted articulated on the said first floating means and on the said assembly entity to allow relative movement of the said first floating means and of the said assembly entity at least in a vertical direction. Thus it is possible to heavily load the first floating means by winding a long length of rigid pipe onto the intermediate winding means without the fear of the said first floating means sinking into the water with respect to the assembly unit.

According to another particularly advantageous embodiment of the invention, the said connecting means comprise catching means that can be locked so as to obtain removable connecting means. By virtue of this characteristic it is possible, on the one hand, to retract the connecting means and to transport the floating means independently of one another and, on the other hand, to load several first floating means separate from one another and each comprising intermediate winding means by detaching the connecting means and the first floating means and then resecuring them to other first floating means. It is thus possible to build up stocks of wound rigid pipes ready to be transferred.

Advantageously, the said connecting means are built with a lattice configuration so that the weight-to-rigidity ratio of the connecting means is considerably reduced and so that it is possible in particular to pass the rigid pipe through the connecting means.

As a preference, the intermediate winding means comprise a storage reel mounted vertically on the said first floating means and which is designed to be driven in rotation about its horizontally-arranged axis so as to wound the said rigid tubular pipe.

According to one advantageous implementation of the invention, the said first floating means comprise ballast weight tanks to weigh down the said first floating means according to the length of rigid tubular pipe wound onto the said winding means. Thus, although the connecting means allow relative vertical movement of the first floating means with respect to the assembly unit, it is preferable for the first floating means to be kept in a relatively fixed position in order to guide the rigid pipe in a more or less constant direction from the assembly unit towards the winding means. By emptying out the ballast tanks during loading, the first floating means are lightened and this lightening compensates for the weight of the pipe.

Furthermore, advantageously, the first floating means consist of a barge or of a vessel with a stable hull, in which case the presence of the ballast tanks assumes less importance.

BRIEF DESCRIPTION OF THE DRAWINGS

Other particulars and advantages of the invention will become apparent from reading the description given hereinafter of some particular embodiments of the invention which are given by way of nonlimiting indication with reference to the attached drawings in which:

FIG. 1 illustrates an installation for producing wound rigid tubular pipe according to the invention. In that which follows of the description the rigid tubular pipe will simply be termed pipe, to make the explanation clearer.

Figure 1:
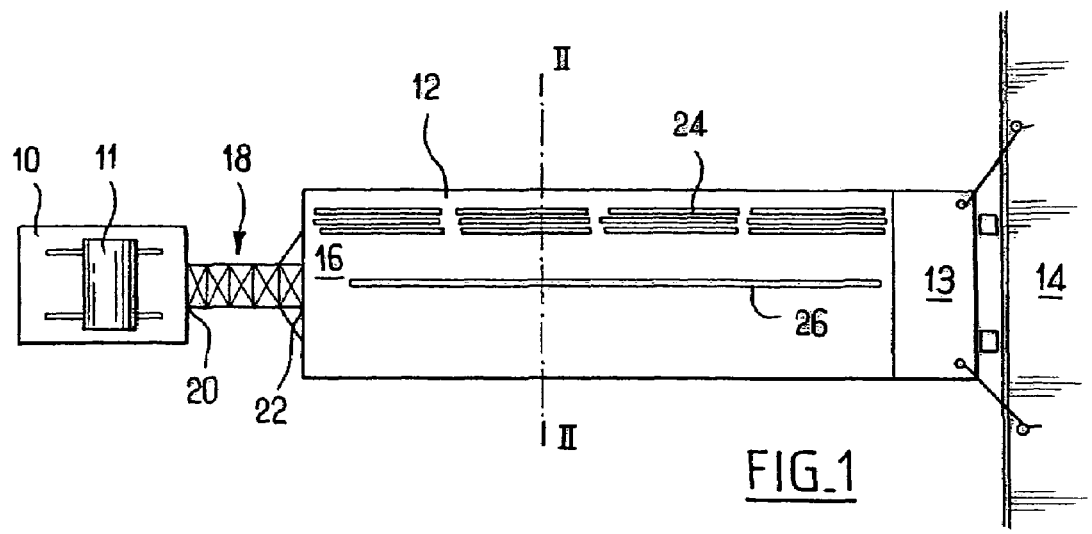
FIG. 1 is a schematic view from above showing an installation according to the invention.

The installation depicted in FIG. 1 in a view from above, comprises first floating means 10 consisting of a first barge supporting an intermediate storage reel 11 and second floating means 12 here made up of a second barge on which pipes are made, the barges 10 and 12 being afloat, for example in a port. The first barge 10 has a length of between 15 and 45 metres, for example of 30 metres, and the second barge 12 has a length of between 40 and 140 metres, for example of 120 metres.

A first end 13 of the second barge 12 is moored at dockside 14 and the first barge 10 is connected to the second end 16 of the second barge 12 by connecting means 18. The first end 13 is connected to the dockside 14 so as to stabilize the second barge 12 more or less at right angles with respect to the dockside 14 and to do so during the production of the pipe that will be described hereinbelow.

Furthermore, the connecting means 18, which are of parallelepipedal overall shape, allow the first barge 10 to be kept aligned in the continuation of the second barge 12. By contrast, their ends are mounted articulated respectively to the first barge 10 and to the second barge 12 about horizontal axes 20 and 22 that are mutually parallel. As will be explained in greater detail in the description which will follow, these articulations allow the relative motion of the barges 10, 12 with respect to one another about a horizontal axis parallel to the plane of FIG. 1. Quite obviously, the same result could be obtained with connecting means consisting of a deformable parallelepipedal the ends of which would each have four points of attachment to each of the barges 10, 12, the points of attachment not being situated on the same axis.

Figure 2:
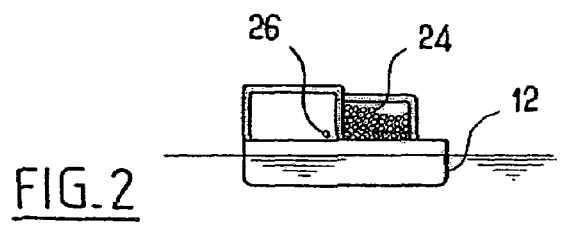
FIG. 2 is a cross section on II-II of an element of the installation depicted in FIG. 1.

The second barge 12, which is seen again in vertical section in FIG. 2, comprises a stock 24 of rigid tubes and assembly means, not depicted, for assembling these rigid tubes. They are first of all welded together, end to end, to form lengths 26 of pipe. Beforehand, a protective tube, generally made of plastic, may be inserted inside the rigid tube to protect its interior wall.

Next, lengths 26 of pipe are assembled in turn to form the pipe as it is gradually driven in a translational movement towards the first barge 10 to be wound onto the intermediate storage reel 11 as will be explained later on in the description. The pipe is covered with a protective coating which in particular protects it from corrosion. Thus, once the lengths 26 have been welded, a coating union is made to ensure its continuity of the coating on the pipe.

Furthermore, the second barge 12 comprises guide means, not depicted, allowing the length of pipe 26 to be guided when, coupled to the pipe portion already wound, it is driven in a translational movement towards the first barge 10. The coupling of the length 26 to the wound pipe portion is performed by welding on the second barge 12 near its end 16. Obviously, the winding means that will be described with reference to FIG. 3 are not in service during this coupling phase.

FIG. 3 again shows, in a side view, the first barge 10 and the end 16 of the second barge 12 with which it is aligned. The two barges 10, 12 are joined together by the connecting means 18 formed of a lattice-work construction. This construction has the advantage of being strong in elongation and in buckling in spite of a relatively light weight, which means that the relative position of the two barges 10, 12 is kept constant along their longitudinal axis.

Figure 3:
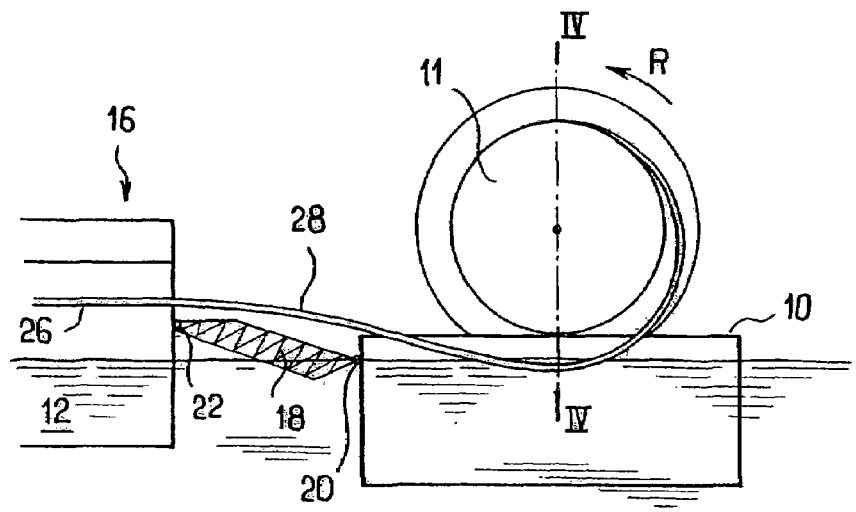
FIG. 3 is a partial schematic side view of the installation depicted in FIG. 1.

Furthermore, also visible in FIG. 3 are the horizontal axes 20, 22 respectively connecting one end of the connecting means 18 to the first barge 10 and the other end of the connecting means 18 to the end 16 of the second barge 10. The ends of the connecting means 18 are mounted to pivot on each of the barges, which means that they remain secured to one another in spite of the lightening of the second barge 12 at the expense of the first barge 10, which tends to force them in opposing vertical directions.

Furthermore, by virtue of lockable catching means, not depicted, mounted at least at one end of the connecting means 18, the first 10 and second 12 barges can easily be detached. This possibility is of particular benefit for winding pipes onto several intermediate storage reels mounted on several different first barges that are moved away in turn after loading.

The lengths of pipe 26 are assembled with the pipe portion 28 already engaged and at least partially wound onto the intermediate storage reel 11.

The pipe is plastically deformed as it is wound, and to do this the pipe portion 28 is guided in translation more or less at a tangent to the intermediate storage reel 11, which is driven in rotation in the direction of the arrow R. In that way, the intermediate storage reel 11 plastically deforms the pipe 28 by winding it around its drum then in successive layers.

Figure 4:
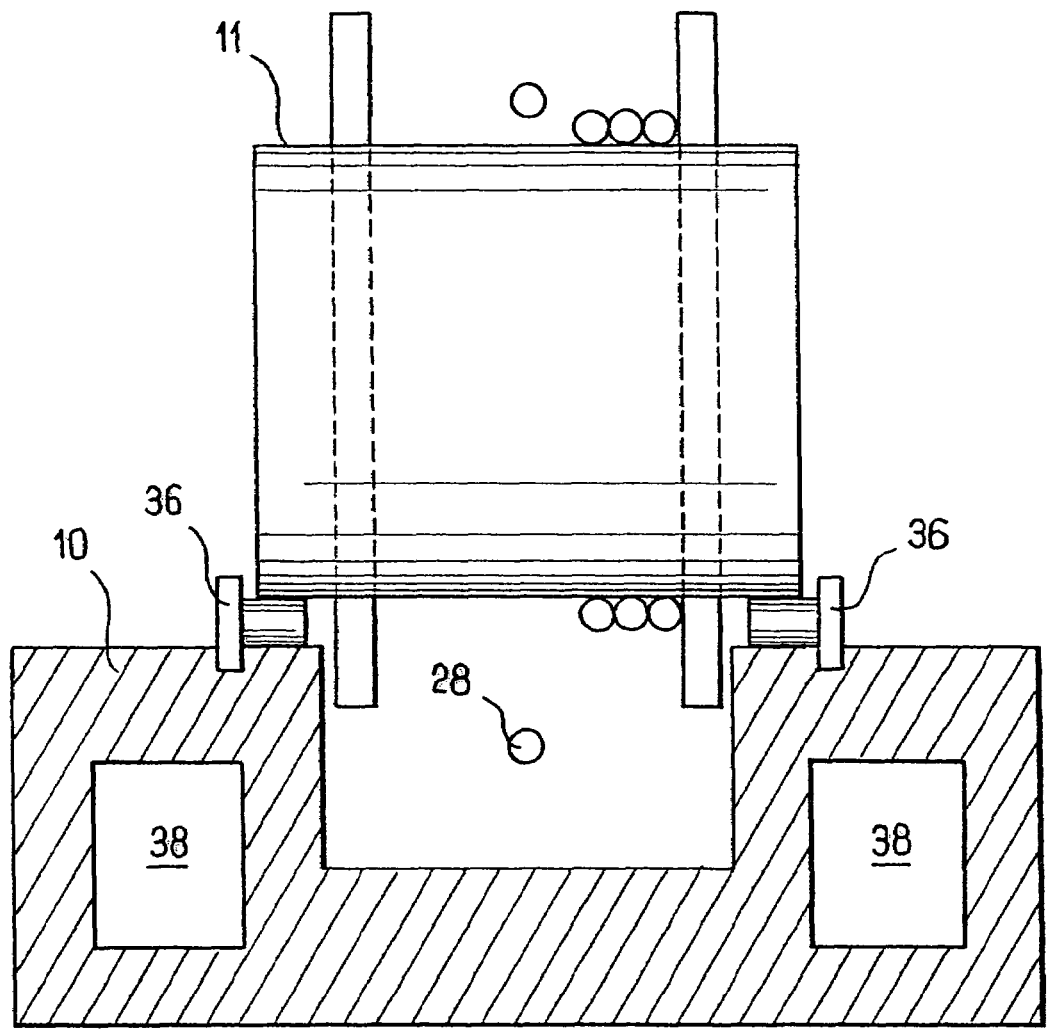
FIG. 4 is a section on IV-IV of an element depicted in FIG. 3.

Thus, while the lengths of pipe 26 are being assembled, the pipe 28 is driven, at least sequentially to allow the pipe lengths 26 to be coupled, and is wound onto the intermediate storage reel 11 that can be seen again in vertical section in FIG. 4, mounted on the first barge 10.

In addition, the intermediate storage reel 11 comprises a tensioner distributor guide, not depicted, to allow the pipe to be wound evenly without leaving gaps.

The intermediate storage reel is arranged on the first barge 10 resting on rollers 36 to guide it in its rotation.

Incidentally, this FIG. 4 depicts ballast tanks 38 formed in the first barge 10 which are intended to limit the variations in depth to which the first barge 10 sinks into the water as a function of the level of loading of the intermediate storage reel 11, that is to say as a function of the length of pipe wound.

To do this, the ballast tanks are filled when the intermediate storage reel 11 is empty and are gradually emptied as the pipe is wound. Thus, the first barge 10 tends to sink into the water as the intermediate storage reel 11 is loaded because the weight of the first barge 10 increases and this sinking is compensated for by the lightening of the barge by emptying the ballast tanks.

However, the first barge 10 may be replaced by floating means with a stable hull, in which case the ballast weight is not absolutely necessary because the floating means are more stable than a barge.

Figure 5:
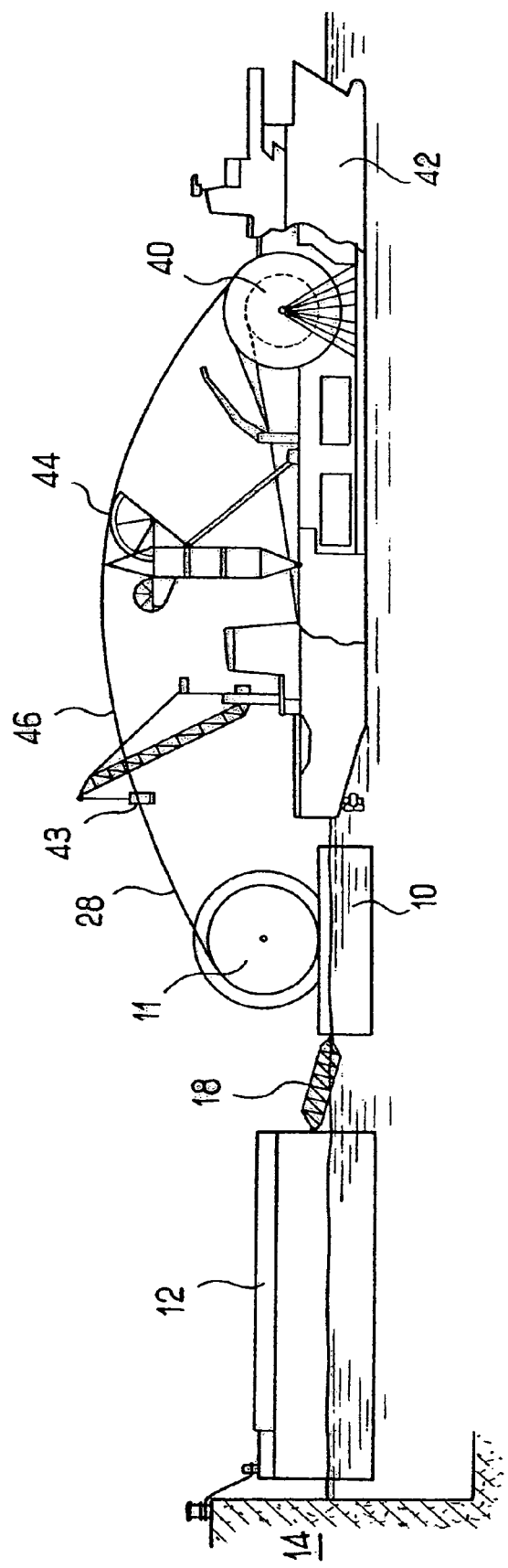
FIG. 5 is an overall schematic side view showing the operation of the installation illustrated in FIG. 1.

Reference will now be made to FIG. 5 to describe the loading of the wound pipe 28 on the intermediate storage reel 11 towards a storage reel 40 belonging to a laying boat 42.

It will be understood that when the pipe 28 is being transferred to the laying boat, the loading of the intermediate storage reel 11 is halted, especially if the barges 10, 12 are coupled. In addition, the benefit of such an installation lies in the possibility of storing a full pipe, which takes less time to transfer to the laying boat than it takes to produce the pipe, because this transfer is performed continuously.

In FIG. 5, the laying boat 42 is immobilized in the continuation of the first barge 10, the storage reel 40 of the laying boat being directed in the direction of the intermediate storage reel 11 so that the two mean planes that they define are more or less coincident. The end of the pipe 28 corresponding to the last uncoupled end of the last length of pipe has been carried as far as the storage reel 40 of the laying boat 42 by lifting and movement means, for example a crane the end of which is equipped with a non-return clamp 43, and it rests on guide means 44 belonging to the laying boat 42. The non-return clamp 43 comprises conical means, for example, and is held in position, with the pipe 28 passing through it, for the duration of the transfer, so as to hold it and prevent it from returning elastically, particularly in the event of rupture.

Furthermore, tensioners, not depicted, and situated on the laying boat allow the supply to the storage reel of the laying boat to be controlled.

This end of the pipe 28 has been plastically deformed like the substantial part of it which is wound onto the intermediate storage reel 11 and it is elastically deformed and forcibly driven towards the storage reel 40.

Thus, the pipe 28 is suitable to be unwound from the intermediate storage reel 11 to be wound onto the storage reel 40 of the laying boat 42 in an arc 46 the radius of curvature of which is greater than that of the wound pipe. However, the pipe 28 is only deformed elastically during transfer and requires no additional shaping to be rewound onto the storage reel 40. When the pipe 28 has been fully transferred onto the storage reel 40 of the laying boat 42 the latter can go out to a laying site while the production of wound pipes can resume.

Incidentally, since the installation according to the invention is mounted on floating means, it can be towed to and moored at any desired place, preferably not far from the pipe laying site.

According to one particularly advantageous embodiment of the invention, the installation further comprises a laying boat whose storage reel allows the winding of the said pipe with a radius of curvature smaller than the radius of curvature of the said pipe wound onto the said intermediate winding means. To do this, the drum diameter of the intermediate storage means 11 is greater than the drum diameter of the storage reel of the laying boat, and preferably greater than the diameter of the last turn wound onto the storage reel of the laying boat.

By virtue of this characteristic, no straightener is needed when transferring the rigid pipe because the pipe can be deformed plastically in the direction of a reduction in its radius of curvature with the simple motorized drive of the winding means.

Furthermore, the present invention also relates to a method for manufacturing a wound rigid tubular pipe, the said rigid tubular pipe being intended to be installed subsea by a laying ship to carry hydrocarbons in particular, the said method comprising a step of assembling a plurality of rigid tubes end to end to obtain lengths and of assembling the said lengths in such a way as to form the said rigid tubular pipe which is intended to be wound onto a storage reel situated on the said laying ship having undergone plastic deformation.

The said method comprises the following steps:
  the said rigid tubular pipe is plastically deformed then wound onto first floating means (10) separate from the said laying ship after the said rigid tubular pipe (28) has been formed; and
  the wound rigid tubular pipe is transferred from the said floating means to the said laying ship by rewinding it onto the said storage reel.

This transfer is advantageously done without the need to straighten the pipe.

The invention claimed is:

1. An installation for manufacturing a wound rigid tubular pipe, the wound rigid tubular pipe being intended to be installed subsea by a laying ship, the installation comprising:
   the laying ship;
   an assembly unit operable for assembling a plurality of rigid tubes end to end to obtain tube lengths, the assembly unit being further operable for assembling the tube lengths to form a rigid tubular pipe;
   a first float separate from the laying ship, the first float being positioned between the assembly unit and the laying ship;
   an intermediate winding and deforming apparatus arranged on the first float, the intermediate winding and deforming apparatus being operable to plastically deform the rigid tubular pipe and to wind the rigid tubular pipe onto the intermediate winding and deforming apparatus after the rigid tubular pipe has been formed;
   a connector connecting together the first float and the assembly unit such that the first float is aligned with the assembly unit, the connector including an articulated mount mounted on the first float and on the assembly unit, the articulated mount being operable to allow relative movement of the first float and the assembly unit at least in a vertical direction; and
   a storage reel positioned on the laying ship, the rigid tubular pipe being wound onto the storage reel after being plastically deformed by the intermediate winding and deforming apparatus.

2. The installation according to claim 1, wherein the intermediate winding and deforming apparatus comprises an intermediate storage reel having a first drum diameter which is greater than a second drum diameter of the storage reel of the laying ship.

3. The installation according to claim 2, wherein the first drum diameter of the intermediate storage reel is greater than a maximum diameter of a last portion of the rigid pipe that is likely to be wound onto the storage reel of the laying ship.

4. The installation according to claim 1, further comprising a second float on which the assembly unit is mounted.

5. The installation according to claim 4, wherein the second float has a length of between 40 and 120 meters along a direction between the storage reel and the intermediate winding and deforming apparatus.

6. The installation according to claim 1, wherein the connector comprises a catch that can be locked so as to obtain a removable connector.

7. The installation according to claim 1, wherein the connector has a lattice configuration.

8. The installation according to claim 1, wherein the intermediate winding and deforming apparatus comprises an intermediate storage reel mounted vertically on the first float, the intermediate storage reel being drivable to rotate about a horizontally-arranged axis to wind the rigid tubular pipe.

9. The installation according to claim 1, wherein the first float comprises a float ballast weight tank fillable to weigh down the first float according to a length of the rigid tubular pipe wound onto the intermediate winding apparatus.

10. The installation according to claim 1, wherein the first float comprises a barge or a vessel with a stable hull.

11. A method for manufacturing a wound rigid tubular pipe, the wound rigid tubular pipe being intended to be installed subsea by a laying ship, the method comprising:
   assembling a plurality of rigid tubes end to end to obtain tube lengths and assembling the tube lengths to form a rigid tubular pipe, the assembling being performed at an assembly unit;
   positioning a connector to connect the assembly unit to a first float positioned between the assembly unit and the laying ship, the assembly unit being aligned with the first float after the connector is positioned;
   conveying the rigid tubular pipe to the first float from the assembly unit over the connector;
   plastically deforming the rigid tubular pipe and then winding the deformed rigid tubular pipe onto an intermediate storage reel at the first float after the rigid tubular pipe has been assembled; and
   transferring the wound rigid tubular pipe from the intermediate storage reel of the first float to a storage reel positioned on the laying ship by rewinding the rigid tubular pipe onto the storage reel after the rigid tubular pipe was subjected to plastic deformation.

* * * * *